United States Patent
Ondracek et al.

(10) Patent No.: US 12,107,313 B2
(45) Date of Patent: Oct. 1, 2024

(54) METHODS AND APPARATUSES FOR REDUCING PASSIVE INTERMODULATION DISTORTION IN TRANSMISSION LINES

(71) Applicant: Outdoor Wireless Networks LLC, Claremont, NC (US)

(72) Inventors: Frantisek Ondracek, Pardubice (CZ); Tomas Ther, Police Nad Metuji (CZ); Jiri Kasik, Pardubice (CZ)

(73) Assignee: Outdoor Wireless Networks LLC, Claremont, NC (US)

( * ) Notice: Subject to any disclaimer, the term of this patent is extended or adjusted under 35 U.S.C. 154(b) by 997 days.

(21) Appl. No.: 16/810,447

(22) Filed: Mar. 5, 2020

(65) Prior Publication Data
US 2020/0350652 A1    Nov. 5, 2020

Related U.S. Application Data

(60) Provisional application No. 62/842,363, filed on May 2, 2019.

(51) Int. Cl.
| | |
|---|---|
| *H01Q 1/52* | (2006.01) |
| *H01P 3/06* | (2006.01) |
| *H01P 5/02* | (2006.01) |
| *H01Q 5/50* | (2015.01) |
| *H04B 3/50* | (2006.01) |

(52) U.S. Cl.
CPC ............ *H01P 5/02* (2013.01); *H01P 3/06* (2013.01); *H01Q 1/52* (2013.01); *H01Q 5/50* (2015.01); *H04B 3/50* (2013.01)

(58) Field of Classification Search
CPC .. H01Q 1/52; H01Q 5/25; H01Q 5/50; H01Q 21/06; H01Q 21/22; H01P 1/045; H01P 1/38; H01P 3/06; H01P 3/085
See application file for complete search history.

(56) References Cited

U.S. PATENT DOCUMENTS

| | | | |
|---|---|---|---|
| 4,358,764 A | 11/1982 | Cheal et al. | |
| 4,543,583 A | 9/1985 | Wurdack | |
| 6,346,923 B1 * | 2/2002 | Johnson | H01Q 25/02 343/853 |
| 8,706,050 B2 * | 4/2014 | Hiramatsu | G01S 13/34 455/73 |

(Continued)

FOREIGN PATENT DOCUMENTS

| | | |
|---|---|---|
| CN | 101953018 A | 1/2011 |
| CN | 109687100 A | 4/2019 |

(Continued)

OTHER PUBLICATIONS

International Searching Authority, "International Search Report and Written Opinion from PCT Application No. PCT/US2020/021208", from Foreign Counterpart to U.S. Appl. No. 16/810,447, Jun. 25, 2020, pp. 1 through 11, Published: WO.

(Continued)

*Primary Examiner* — Tung X Le
(74) *Attorney, Agent, or Firm* — Fogg & Powers LLC

(57) ABSTRACT

Methods and apparatuses for reducing passive intermodulation distortion arising from a joint attaching conductors by forming the joint with a single metal or covering the joint with a single layer of metal having a thickness greater than a skin depth of the frequency of signals propagating through the joint.

25 Claims, 6 Drawing Sheets

(56) References Cited

U.S. PATENT DOCUMENTS

| | | | | |
|---|---|---|---|---|
| 2005/0190101 A1* | 9/2005 | Hiramatsu | ............. | H01Q 13/24 |
| | | | | 342/134 |
| 2006/0170515 A1* | 8/2006 | Yoshida | .................... | H01P 5/02 |
| | | | | 333/33 |
| 2008/0211604 A1* | 9/2008 | Katayama | ................. | H01P 5/08 |
| | | | | 333/238 |
| 2010/0233903 A1 | 9/2010 | Islam | | |
| 2014/0177755 A1 | 6/2014 | Lu et al. | | |
| 2015/0349433 A1* | 12/2015 | Clark | .................... | H01Q 21/22 |
| | | | | 342/368 |
| 2017/0084972 A1 | 3/2017 | Niiranen | | |
| 2019/0069342 A1 | 2/2019 | Ashworth et al. | | |

FOREIGN PATENT DOCUMENTS

| | | |
|---|---|---|
| KR | 20020069178 A | 8/2002 |
| KR | 20140064044 A | 5/2014 |
| KR | 20180112179 A | 10/2018 |
| WO | 2019010051 A1 | 1/2019 |

OTHER PUBLICATIONS

China National Intellectual Property Administration, "Notification of the First Office Action ", from CN Application No. 202080031718.0 from Foreign Counterpart to U.S. Appl. No. 16/810,447, Apr. 6, 2022, pp. 1 through 19.

China National Intellectual Property Administration, "Notice to Grant", from CN Application No. 202080031718.0, May 2, 2023, from Foreign Counterpart to U.S. Appl. No. 16/810,447, pp. 1 through 5, Published: CN.

Zhang, Ping, "Analysis of RF Cable Assembly Failure and Improvement in Design", Electric Wire & Cable, No. 4, 2008, Aug. 2008, pp. 1 through 4.

China National Intellectual Property Administration, "Notification of Second Office Action", from CN Application No. 202080031718.0, Dec. 2, 2022, from Foreign Counterpart to U.S. Appl. No. 16/810,447, pp. 1 through 14, Published: CN.

* cited by examiner

METHODS AND APPARATUSES FOR REDUCING PASSIVE INTERMODULATION DISTORTION IN TRANSMISSION LINES

CROSS-REFERENCE TO RELATED APPLICATIONS

The present application claims benefit of U.S. Patent Application Ser. No. 62/842,363, filed May 2, 2019; the entire contents of the aforementioned patent application are incorporated herein by reference as if set forth in its entirety.

BACKGROUND

A communications system comprises at least one duplexer and/or filter coupled to one or more antennas. Each duplexer or filter may be coupled by a system of transmission lines to the antenna(s), e.g. using a trunk branch architecture. Some of the transmission lines of the transmission lines system may also be referred to as phasing lines. The lengths of one or more of the phasing lines may be designed to impedance match a duplexer or filter in its passband(s).

To diminish insertion loss, the transmission lines may be formed within a conductive block, e.g. a metal block. Due to the complex structure of the transmission lines, the conductive block may be formed by at least two conductive portions which are subsequently attached, e.g. by solder or welding, and/or mechanical fasteners such as screws.

Although different types of transmission lines can be implemented in the conductive block, one type of transmission line that may be used is a coaxial wave guide. A coaxial waveguide comprises with a center conductor surrounded by an insulator; the conductive block forms an outer conductor around the insulator, and thus the center conductor. When coaxial waveguides are used to form transmission lines having a trunk and branch architecture, one or more coaxial branch transmission lines may have to be coupled to a coaxial trunk transmission line. This may require connecting center conductors of the phasing, or branch transmission, lines to the center conductor of the trunk transmission line.

Typically, the center conductors of a trunk and branch transmission lines are electrically and mechanically connected by joints, e.g. solder joints. The solder joints typically comprise different conductors. For example, solder is may be formed from a metallic alloy, e.g. lead tin. Passive intermodulation distortion (PIMD) products can arise due to the use of different conductors, oxidation formation on the conductors when the solder joints are formed, and/or irregular surface quality of the solder joints.

Passive intermodulation distortion (PIMD), like active intermodulation distortion, creates mixing products. The mixing products, or PIMD products, can reduce the sensitivity of a receiver of the communications system, and thus diminishes the reception range of the communications system.

SUMMARY

A method for joining a first conductor of a first transmission line to a second conductor of a second transmission line is provided. The method comprises: attaching the first conductor to the second conductor with a joint formed by at least one other conductor, where the at least one other conductor comprises one or more types of metal; and if the at least one other conductor comprises at least one of more than one metal and a mechanical fastener, then the method further comprises covering at least the joint with a layer of one type of metal having a thickness equal to or greater than a skin depth corresponding to a carrier frequency of signals, where the transmission lines are configured to propagate the signals.

DRAWINGS

Understanding that the drawings depict only exemplary embodiments and are not therefore to be considered limiting in scope, the exemplary embodiments will be described with additional specificity and detail using the accompanying drawings, in which.

DETAILED DESCRIPTION

Figure 1A:
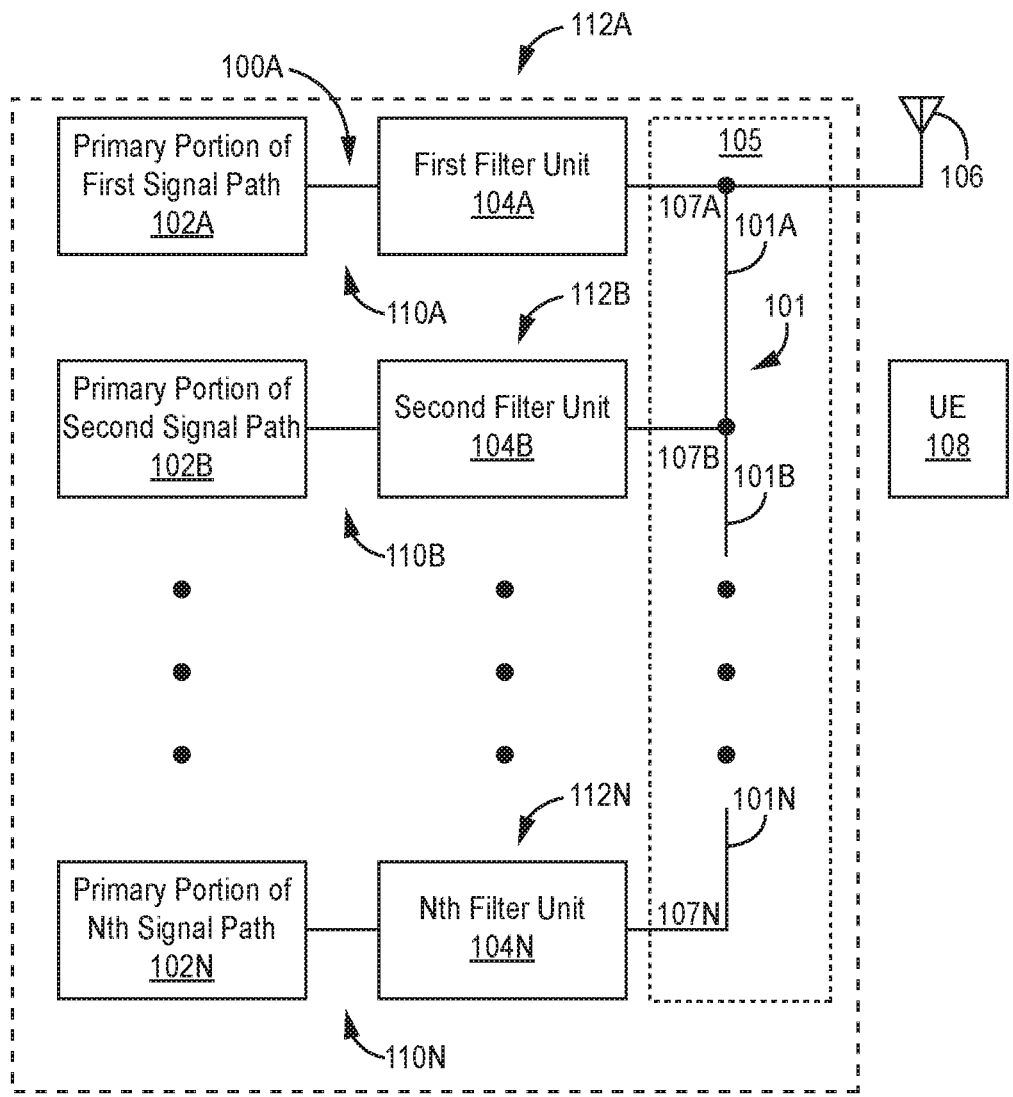
FIG. 1A illustrates a block diagram of one embodiment of a wireless communications device made according to one embodiment of the invention.

In the following detailed description, reference is made to the accompanying drawings that form a part hereof, and in which is shown by way of illustration specific illustrative embodiments. However, it is to be understood that other embodiments may be utilized, and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

The techniques described below are applicable to any type of communications system configured to operate in one or more frequency bands, such as a cellular base station such as an LTE eNodeB used in a cellular network or a repeater device (such as a remote antenna unit of a distributed antenna system (DAS) or a single-node repeater). However, for pedagogical reasons, the description of some embodiments is presented below in connection with a wireless communications device generally, and a remote antenna unit of a DAS specifically. Nonetheless, it is to be understood that the techniques described here can be used with wireless communications devices other than remote antenna units.

FIG. 1A illustrates a block diagram of one embodiment of a wireless communications device 100A made according to one embodiment of the invention. The wireless communications device 100A can comprises any communications device that employs one or more filter units. Examples of a wireless communications device 100 include, for example, a cellular base station (such as an LTE eNodeB used in a cellular network), and a repeater device (such as a remote antenna unit of a DAS or a single-node repeater). In the illustrated embodiment, the wireless communications device 100 is configured to facilitate wireless communications with at least one other wireless communications device 108, e.g. user equipment (UE), through at least one signal path.

The wireless communications device 100 comprises N signal paths 110A, 110B, 110N. Each signal path 110A, 110B, 110N comprises a corresponding primary portion 102A, 102B, 102N coupled to a corresponding filter unit 104A, 104B, 104N. Three signal paths are illustrated in FIGS. 1A and B for pedagogical purposes; however, N may be an integer greater than or equal to one.

Each signal path 110A, 110B, 110N comprises at least one of an uplink signal path and a downlink signal path. The downlink signal path is configured to output one or more downlink radio frequency signals that are radiated from one or more antennas 106 associated with the wireless communications device 100 for reception by the at least one other wireless communications device 108. The uplink signal path 104 is configured to receive one or more uplink radio frequency signals transmitted from the at least one wireless communications device 108. For example, where the wireless communications device 100 is implemented as a base station or access point, the downlink and uplink signal paths are configured to perform all Layer-3, Layer-2, and Layer-1 processing and operations required by the relevant wireless interface that are necessary to generate and transmit the downlink radio frequency signals and to receive, demodulate, and decode the uplink radio frequency signals, respectively.

In other embodiments where the wireless communications device 100 is implemented as a repeater device (such as a remote antenna unit of a DAS or a single-node repeater), the downlink and uplink signal paths are configured to perform at least some of the repeater processing or operations necessary to output the downlink radio frequency signals as a repeated version of downlink radio frequency signals originally transmitted by one or more other base stations or access points and to receive the uplink radio frequency signals and output a repeated version of the uplink radio frequency signals that are communicated to the one or more base stations or access points, respectively. As used here, "downlink" refers to the direction of signal flow towards the antenna(s) 106 and the other wireless communications device 108, and "uplink refers to the direction of signal flow from the antenna(s) 106 and the other wireless communications device 108.

Each filter unit 104A, 104B, 104N comprises one or more filters, e.g. bandpass filters. Optionally, a filter unit may be an n-plexer. An n-plexer comprises n filters having unique three decibel passbands which do not overlap; n is an integer greater than or equal to two. For example, n may be two, and the filter unit would be a duplexer. For an n-plexer, such as a duplexer, each primary portion of an uplink path and each primary portion of a downlink path is coupled to a unique filter of the n-plexer. Thus, the n-plexer provides isolation between such paths.

Typically, for a duplexer, the primary portion of an uplink path and the primary portion of a corresponding downlink path are coupled to unique filters of the duplexer. Thus, the duplexer provides isolation between the primary portion of uplink path and the primary portion of the downlink path.

A transmission line system 105 couples at least one antenna 106 to each filter unit 104A, 104B, 104N. Each of the at least one antenna 106 and the transmission line system 105 may or may not be part of the wireless communications device 100A. Each secondary portion 112A, 112B, 112N of each signal path 110A, 110B, 110N comprises the corresponding filter unit 104A, 104B, 104N. Each secondary portion 112A, 112B, 112N also comprises a corresponding portion of the transmission line system 105 and/or the at least one antenna 106 if those components are part of the wireless communications device 100A.

The illustrated transmission line system 105 comprises a transmission line trunk line 101 comprising transmission line trunk line segments 101A, 101B, 101N which are sequentially coupled to one another. Phasing lines 107A, 107B, 107C connect the transmission line trunk line 101 to corresponding filter units 104A, 104B, 104N at connection nodes 107A, 107B, 107N. Each phasing line is connected to the transmission line trunk line 101 in parallel with other phasing lines; each phasing line may be connected to a connection between two unique transmission line trunk line segments.

Figure 1B:
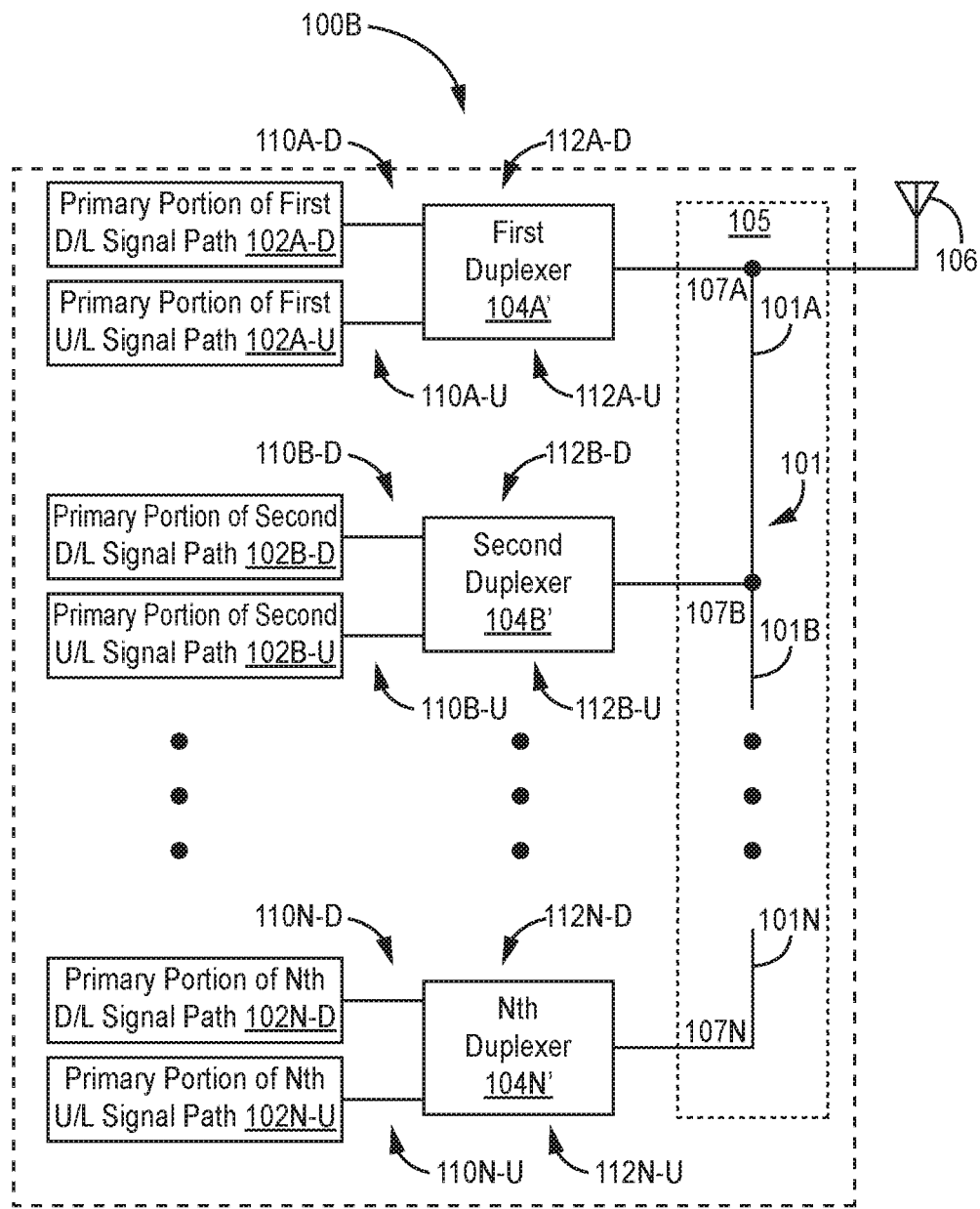
FIG. 1B illustrates an embodiment of a remote antenna unit made according to one embodiment of the invention.

FIG. 1B illustrates an embodiment of a remote antenna unit (RAU) 100B made according to one embodiment of the invention. The remote antenna unit 100B is similar to the wireless communications device 100A but comprises N downlink signal paths 110A-D, 110B-D, 110N-D and N uplink signal paths 110A-U, 110B-U, 110N-U. The uplink and downlink signal paths operate as described above for the wireless communications device 100A.

Further, in the remote antenna unit 100B, each downlink signal path 110A-D, 110B-D, 110N-D comprises a corresponding primary portion 102A-D, 102B-D, 102N-D coupled to a corresponding duplexer 104A', 104B', 104N'. A primary portion of a downlink signal path may also be referred to as a primary downlink signal path. A primary portion of an uplink signal path may also be referred to as a primary uplink signal path.

Each duplexer is configured so that it includes at least a portion of either (or both) of a downlink signal path and an uplink signal path. The portions of the downlink signal path and the uplink signal path are the primary portions of the downlink signal path and the uplink signal path discussed above. The portions (if any) of the downlink signal path and the uplink signal path that are included in each duplexer are referred to here as the "secondary portions" of the downlink signal path and the uplink signal path. A secondary portion 112A-D, 112B-D, 112N-D of a downlink signal path may also be referred to as a secondary downlink signal path. A secondary portion 112A-U, 112B-U, 112N-U of an uplink signal path may also be referred to as a secondary uplink signal path.

As with the wireless communications device 100A, each of the at least one antenna 106 and the transmission line system 105 may or may not be part of the remote antenna unit 100B. Thus, the secondary portion 112A, 112B, 112N may also be located in a corresponding portion of the transmission line system 105 and/or the antenna depending upon whether those components are part of the remote antenna unit 100B.

Figure 2:
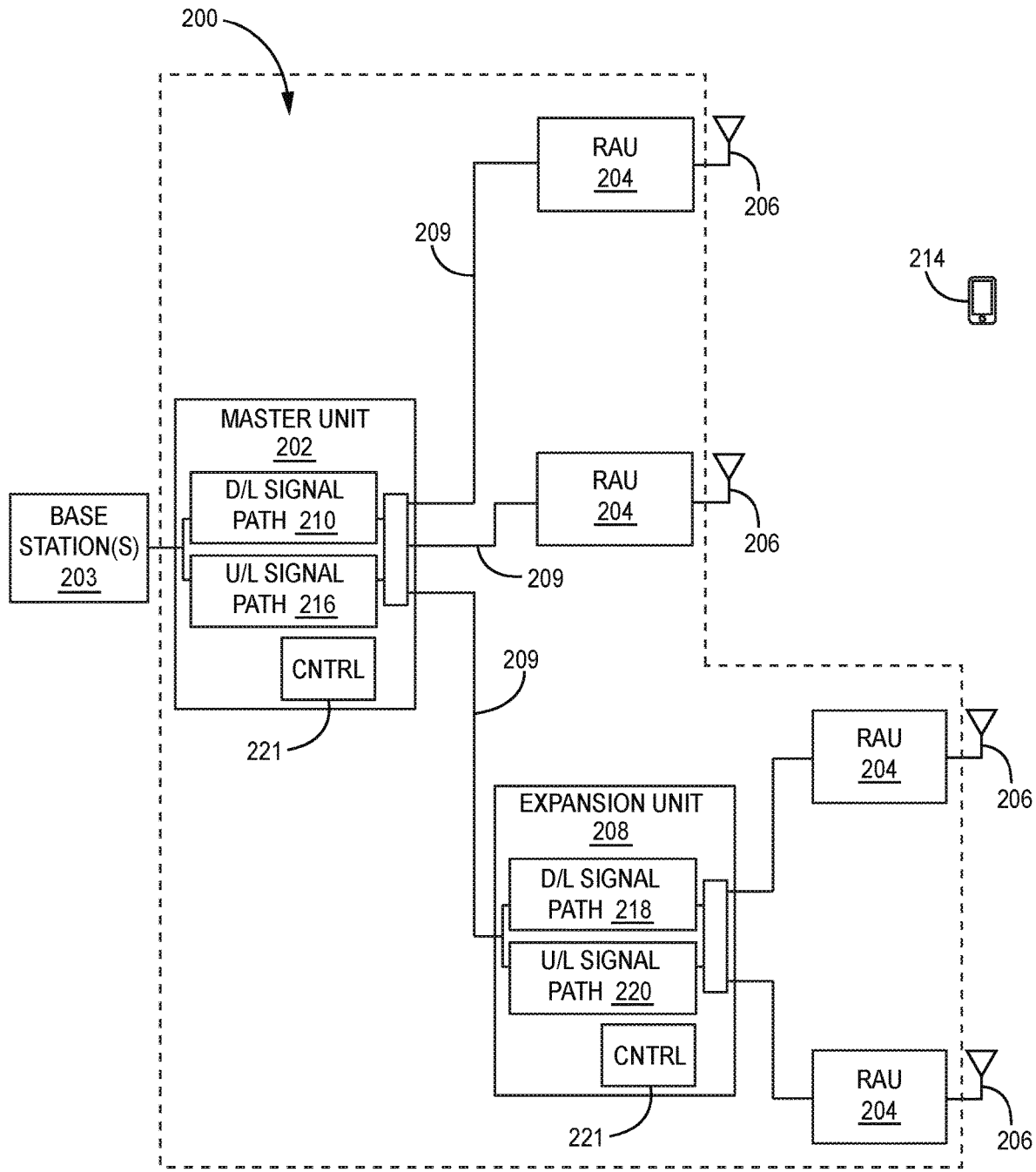
FIG. 2 illustrates a block diagram of one embodiment of a distributed antenna system implemented according to one embodiment of the invention.

FIG. 2 illustrates a block diagram of one embodiment of a distributed antenna system 200 implemented according to one embodiment of the invention. The DAS 200 comprises one or more master units 202 that are communicatively coupled to one or more RAUs 204 via one or more cables 209, e.g. optical or copper cables. Each remote antenna unit 204 can be communicatively coupled directly to one or more of the master units 202 or indirectly via one or more other remote antenna units 204 and/or via one or more expansion (or other intermediary) units 208. Each RAU 204 is configured to be implemented using one of the embodiments described below.

Further, each RAU 204 is configured to be coupled to one or more antennas 206. However, in an alternative embodiment, a RAU may include one or more antennas.

The DAS 200 is coupled to one or more base stations 203 and is configured to improve the wireless coverage provided by the base stations 203. The capacity of each base station 203 can be dedicated to the DAS 200 or can be shared among the DAS 200 and a base station antenna system that is co-located with the base stations 203 and/or one or more other repeater systems.

In the embodiment shown in FIG. 2, the capacity of one or more base stations 203 are dedicated to the DAS 200 and are co-located with the DAS 200. The base stations 203 are coupled to the DAS 200. It is to be understood however that other embodiments can be implemented in other ways. For example, the capacity of one or more base stations 203 can be shared with the DAS 200 and a base station antenna system co-located with the base stations 203 (for example, using a donor antenna). The base stations 203 can include one or more base stations that are used to provide commercial cellular wireless service and/or one or more base stations that are used to provide public and/or private safety wireless services (for example, wireless communications used by emergency services organizations (such as police, fire and emergency medical services) to prevent or respond to incidents that harm or endanger persons or property).

The base stations 203 can be coupled to the master units 202 using a network of attenuators, combiners, splitters, amplifiers, filters, cross-connects, etc., (sometimes referred to collectively as a "point-of-interface" or "POI"). This network can be included in the master units 202 and/or can be separate from the master units 202. This is done so that, in the downlink, the desired set of RF channels output by the base stations 203 can be extracted, combined, and routed to the appropriate master units 202, and so that, in the upstream, the desired set of carriers output by the master units 202 can be extracted, combined, and routed to the appropriate interface of each base station 203. It is to be understood, however, that this is one example and that other embodiments can be implemented in other ways.

In general, each master unit 202 comprises a downlink signal path 210 that is configured to receive one or more downlink signals from one or more base stations 203. Each base station downlink signal includes one or more radio frequency channels used for communicating in the downlink direction with user equipment 214 over the relevant wireless air interface. Typically, each base station downlink signal is received as an analog radio frequency signal, though in some embodiments one or more of the base station signals are received in a digital form (for example, in a digital baseband form complying with the Common Public Radio Interface ("CPR") protocol, Open Radio Equipment Interface ("ORI") protocol, the Open Base Station Standard Initiative ("OB-SAI") protocol, or other protocol). The downlink signal path 210 in each master unit 202 is also configured to generate one or more downlink transport signals derived from one or more base station downlink signals and to transmit one or more downlink transport signals to one or more of the remote antenna units 204.

Each RAU 204 is configured to receive the downlink transport signals transmitted to it from one or more master units 202 and to use the received downlink transport signals to generate one or more downlink radio frequency signals that are radiated from one or more antennas associated with that remote antenna unit 204 for reception by user equipment 214. In this way, the DAS 200 increases the coverage area for the downlink capacity provided by the base stations 203.

Also, each RAU 204 is configured to receive one or more uplink radio frequency signals transmitted from the user equipment 214. These signals are analog radio frequency signals.

Each RAU 204 is also configured to generate one or more uplink transport signals derived from the one or more remote uplink radio frequency signals and to transmit one or more uplink transport signals to one or more of the master units 202.

Each master unit 202 comprises an uplink signal path 216 that is configured to receive the respective uplink transport signals transmitted to it from one or more RAUs 204 and to use the received uplink transport signals to generate one or more base station uplink radio frequency signals that are provided to the one or more base stations 203 associated with that master unit 202. Typically, this involves, among other things, combining or summing uplink signals received from multiple RAUs 204 in order to produce the base station signal provided to each base station 203. In this way, the DAS 200 increases the coverage area for the uplink capacity provided by the base stations 203.

Each expansion unit 208 comprises a downlink signal path 218 that is configured to receive the downlink transport signals transmitted to it from the master unit 202 (or other expansion unit 208) and transmits the downlink transport signals to one or more RAUs 204 or other downstream expansion units 208. Each expansion unit 208 also comprises an uplink signal path 220 that is configured to receive the respective uplink transport signals transmitted to it from one or more RAUs 204 or other downstream expansion units 208, combine or sum the received uplink transport signals, and transmit the combined uplink transport signals upstream to the master unit 202 or other expansion unit 208. In other embodiments, one or more remote antenna units 204 are coupled to one or more master units 202 via one or more other remote antenna units 204 (for example, where the remote antenna units 204 are coupled together in a daisy chain or ring topology).

The downlink signal paths 210 and 218 and uplink signal paths 216 and 220 in each master unit 202 and expansion unit 208, respectively, can be implemented using appropriate circuitry. Thus, the downlink signal paths 210 and 218 can also each be referred to as "downlink circuitry" or "downlink DAS circuitry" 210 and 218, and the uplink signal paths 216 and 220 can also each be referred to as "uplink circuitry" or "uplink DAS circuitry" 216 and 220. The downlink signal paths 210 and 218 and the uplink signal paths 216 and 220 can comprise one or more appropriate connectors, attenuators, combiners, splitters, amplifiers, filters, duplexers, duplexers, transmit/receive switches, analog-to-digital converters, digital-to-analog converters, electrical-to-optical converters, optical-to-electrical converters, mixers, field-programmable gate arrays (FPGAs), microprocessors, transceivers, framers, etc., to implement the features described above. Also, the respective downlink and uplink signal paths in each of the mater units 202 and expansion units 208 may share common circuitry and/or components.

The DAS 200 can use digital transport, analog transport, or combinations of digital and analog transport for generating and communicating the transport signals between the master units 202, the remote antenna units 204, and any expansion units 208. Each master unit 202 and expansion unit 208 in the DAS 200 also comprises a respective controller (CNTRL) 212 (or controller circuitry). The controller 212 is implemented using one or more programmable processors that execute software that is configured to implement the various control functions.

Returning to FIGS. 1A and 1B, implementation of a transmission line system 105 according to embodiments of the invention will now be described. The transmission line system 105 may be formed from one or more different types of transmission lines, including without limitation coaxial waveguide, rectangular waveguide, circular waveguide, microstrip, and strip line. Embodiments of the invention can be used to join or to cover joints of conductors (including ground planes) of transmission lines. Embodiments of the invention can be used to implement the transmission line system 105 described above or in transmission lines used in other applications.

For pedagogical reasons, transmission line system 105 will be described. Further, for pedagogical reasons, the transmission line system 105 will be illustrated as being implemented with coaxial wave guide. Coaxial wave guide comprises a center conductor surrounded by an insulator, e.g. which may include a gas and/or a solid insulator material. An outer conductor surrounds the insulator, and thus the center conductor.

The insulator may be comprised of material of one or more phases (e.g. gas and/or solid material). If an insulator that is a gas is used, the insulator may be for example air or nitrogen. Optionally, if a gaseous insulator is used, one or more pieces of a solid insulator may also be used so as to support the center conductor and to ensure that the center conductor does not contact the outer conductor. The center conductor may be formed with rod or wire from conductors such as brass, copper, aluminum, and/or stainless steel.

The outer conductor may be formed from one or more conductive portions. For example, each of two conductive portions may be machined to form of the outer conductor. The center conductor and insulator are disposed in the two conductive portions. The inner conductor may be affixed within the two conductive portions by one or more pieces of solid insulator. The piece(s) of solid insulator may be disposed in opening(s) within the outer conductor which would normally be filled with gaseous insulator. The two conductive portions may then be attached according to one of the embodiments of the invention.

Figure 3A:
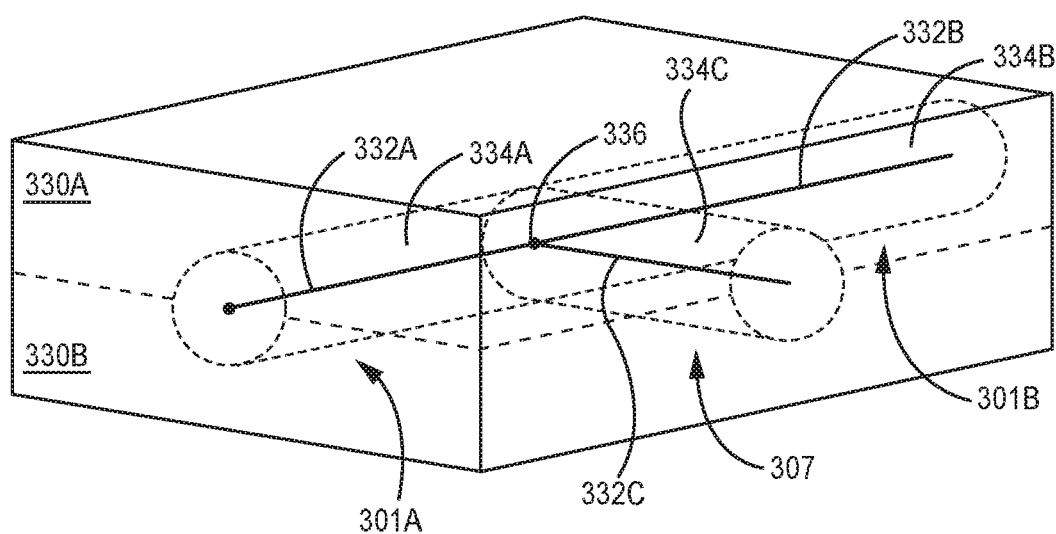
FIG. 3A illustrates a cross section of one embodiment of a portion of a transmission line system formed according to one embodiment of the invention.

FIG. 3A illustrates a cross section of one embodiment of a portion of a transmission line system 305 formed according to one embodiment of the invention. The illustrated portion of the transmission line system 305 comprises a first transmission line trunk line segment 301A, a second transmission link trunk line segment 301B, and a phasing line 307 formed with coaxial transmission lines. The first transmission line trunk line segment 301A comprises a first trunk line center conductor 332A, a first trunk line insulator 334A, and a first trunk line outer conductor formed by a first conductor 330A and a second conductor 330B. The second transmission link trunk line segment 301B comprises a second trunk line center conductor 332B, a second trunk line insulator 334B, and a second trunk line outer conductor formed by the first conductor 330A and the second conductor 330B. The phasing line 307 comprises a phasing line center conductor 332C, a phasing line insulator 334C, and a phasing line outer conductor formed by the first conductor 3301 and the second conductor 330B.

The first trunk line center conductor 332A and the second trunk line center conductor 332B may or may not be formed from a single piece of wire or rod. The first trunk line insulator 334A, the second trunk line insulator 334B, and/or the phasing line insulator 334C may or may not be formed by a single insulator, e.g. air. Each of the first trunk line insulator 334A, the second trunk line insulator, 334A, and the phasing line insulator 334B may be formed by a gaseous insulator and/or piece(s) of solid insulator as described above.

Optionally, the first conductor 330A and/or the second conductor 330B may have material removed, e.g. by mechanical machining, laser oblation, etc., to facilitate insertion of an insulator in place of the removed material. Alternatively, the region where the insulator is placed can be formed by casting in lieu of material removal. In the illustrated embodiment, the cross-section of a region in each of the first conductor 330A and the second conductor 330B where insulator is placed is semicircular; however, other cross sections, such as U-shaped and semi-elliptical, can be used.

If the first trunk line insulator 332A, the second trunk line insulator 334B, and the phasing line insulator 334C are implemented with a gaseous insulator, then solid insulator may be disposed, periodically or aperiodically, in lieu of the gaseous insulator to support the center conductors 332A, 332B, 332C so that they do not contact the outer conductor. Each piece of solid insulator may insulate all or a portion of the circumference of a portion of the conductor with it contacts; the portion of the circumference not insulated by a piece of solid insulator would be insulated by the gaseous insulator.

Typically, the center conductors of phasing lines must be electrically and mechanically joined to the trunk line. This may be performed before or after the conductors are inserted into the outer conductor (e.g. the first conductive portion 330A and the second conductive portion 330B). The resulting joint 336 is achieved by welding, brazing, soldering, and/or any other means of mechanically attaching two conductors including for example using an adhesive (e.g. epoxy or glue) and/or mechanical fastener(s) (e.g. screw(s) and nut(s) and bolt(s)); welding, brazing, soldering, and/or any other means of mechanically attaching two conductors shall be hereinafter collectively referred to as joining. If conductive material is not used for the joining the conductors, then the joint 336 and a portion of each conductor can be covered with conductive material, e.g. as further described herein, to affect an electrical connection between the conductors.

Conventionally made joints give rise to undesirable PIMD products. The PIMD products can be diminished in at least two ways. Firstly, the center conductors are first joined using conventional techniques. Then, a single type of metal (or metal layer), such as silver, gold, or copper, is deposited on joints (and possibly also the center conductors), e.g. by electroplating and/or sputtering. Sputtering is a form of physical vapor deposition that involves ejecting material from a target onto other material, such as the joints. Electroplating is further described below.

The thickness of the single type of metal deposited over at least the joints should be at least one skin depth of the carrier frequency of the signals for which the transmission line system 105 is configured to propagate. Alternating electric current substantially only penetrates from the outer conductive surface by one skin depth of the carrier frequency of such signals. Skin depth is a function of material characteristics and the carrier frequency. In one embodiment, the thickness of the deposited single type of metal should be ten microns; however other thickness may be used depending upon material characteristics and the frequency at which the transmission lines will be used.

An exemplary method of silver electroplating will be illustrated. Silver plating may be performed using an electrolytic bath including silver nitrate and potassium cyanide. An anode of the battery is coupled to a piece of silver placed in the electrolytic bath. A cathode of the battery is coupled to the joined center conductors; the joined center conductors (with or without one of the first conductive portion 330A and the second conductive portion 330B) is placed in the electrolytic bath. The plating time depends upon desired plating thickness, area to be plated, and battery volt-amperes. Electroplating can be employed to deposit a layer of another single type of metal (e.g. gold or copper); however, the electrolytic bath material and/or the metal placed in the electrolytic bath would differ.

Figure 3B:
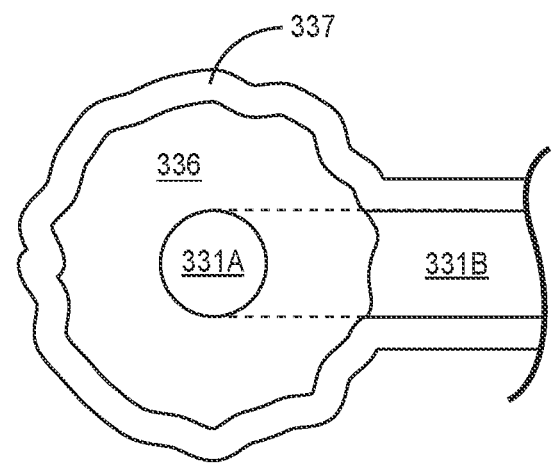
FIG. 3B illustrates a diagram of two conductors connected by a joint covered with a single type of metal.

FIG. 3B illustrates a diagram of two conductors connected by a joint covered with a single type of metal 300B. A first conductor 331A is connected to a second conductor 332B by a joint 336. The first conductor 331A and the second conductor 332B may be center conductors of coaxial wave guides, e.g. a trunk line center conductor and a phasing line center conductor. The joint 336, the first conductor 331A, and the second conductor 332B are covered by a conductive layer 337, e.g. silver.

In lieu of plating the joints, the joints can be formed from the materials described above, e.g. a metal or metal alloy for example including silver, gold, or copper, to form the joints by soldering, brazing, welding, or other methods of conductively joining conductors. Thus, for example, solder comprising a single metal type or braze or filler comprising a single metal type is used to form joints, such as joint 336. Optionally, the joints formed of a single type of metal have a diameter or thickness at least equal to one skin depth of the carrier frequency of the signal for which the transmission line system 105 is configured to propagate (e.g. at least ten microns). If the single type of metal is silver and brazing is used to form a joint, a silver brazing compound, e.g. EcoBraz 38255 B, with a flux, e.g. FP 6000, at a temperature between 550-600 C. Heat can be applied during the brazing process using a flame burner.

Figure 4:
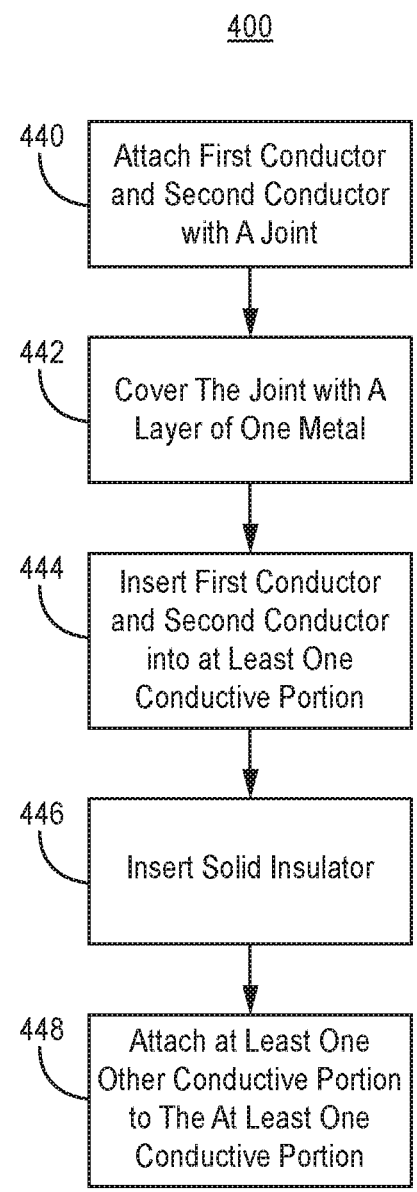
FIG. 4 illustrates a flow diagram of one embodiment of a fabricating joints resulting in diminished PIMD products.

FIG. 4 illustrates a flow diagram of one embodiment of a fabricating joints resulting in diminished PIMD products 400. To the extent that the embodiment of method 400 shown in FIG. 4 is described herein as being implemented in the systems and apparatus described with respect to FIGS. 1-3B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, attaching the first conductor to the second conductor with a joint formed by at least one other conductor, where the at least one other conductor comprises one or more types of metal. Optionally, the at least one conductor comprises only one type of metal, e.g silver. Optionally, the attaching comprises at least one of attaching comprises at least one of soldering, brazing, welding, adhesives, and mechanical fasteners.

Optionally, in block 442, if the at least one other conductor comprises at least one of more than one metal and a mechanical fastener, then cover at least the joint with a layer of one metal having a thickness equal to or greater than a skin depth corresponding to a carrier frequency of signals, where the transmission lines are configured to propagate the signals. Optionally, if the at least one other conductor comprises at least one of more than one metal, and adhesive, and a mechanical fastener, then cover at least the joint with a layer of one metal having a thickness equal to or greater than a skin depth corresponding to a carrier frequency of signals, where the transmission lines are configured to propagate the signals. Optionally, the one metal is silver.

Optionally, in block 444, insert the first conductor and the second conductor into at least one conductive portion that forms at least part of an outer conductor of the coaxial transmission line. Optionally, in block 446, insert at least one solid insulator between the at least one conductive portion and the at least one of a first conductor and a second conductor. Optionally, in block 448, attach at least one other conductive portion to the at least one conductive portion to form the outer conductor.

EXEMPLARY EMBODIMENTS

Example 1 includes a method for joining a first conductor of a first transmission line to a second conductor of a second transmission line, comprising: attaching the first conductor to the second conductor with a joint formed by at least one other conductor, where the at least one other conductor comprises one or more types of metal; and if the at least one other conductor comprises at least one of more than one metal and a mechanical fastener, then the method further comprises covering at least the joint with a layer of one type of metal having a thickness equal to or greater than a skin depth corresponding to a carrier frequency of signals, where the transmission lines are configured to propagate the signals.

Example 2 includes the method of Example 1, wherein if the at least one other conductor comprises at least one of more than the one metal, and adhesive, and the mechanical fastener, then the method further comprises covering at least the joint with a layer of one type of metal having a thickness equal to or greater than a skin depth corresponding to a carrier frequency of signals, where the transmission lines are configured to propagate the signals.

Example 3 includes the method of any of Examples 1-2, wherein the at least one other conductor comprises only one type of metal that is silver.

Example 4 includes the method of any of Examples 1-3, wherein the one type of metal used to form the layer is silver.

Example 5 includes the method of any of Examples 1-4, wherein attaching comprises at least one of soldering, brazing, and welding.

Example 6 includes the method of any of Examples 1-5, wherein covering comprises at least one of electro-plating and sputtering.

Example 7 includes the method of any of Examples 1-6, wherein the first conductor and the second conductor are each a center conductor of a coaxial transmission line.

Example 8 includes the method of Example 7, further comprising, inserting the first conductor and the second conductor into at least one conductive portion that forms at least part of an outer conductor of the coaxial transmission line.

Example 9 includes the method of any of Examples 7-8, further comprising inserting at least one solid insulator between the at least one conductive portion and the at least one of a first conductor and a second conductor.

Example 10 includes the method of Example 9, attaching at least one other conductive portion to the at least one conductive portion to form the outer conductor.

Example 11 includes a transmission line system, comprising: a transmission line trunk line connected to at least one phasing line; wherein a conductor of each phasing line is connected to a conductor of the transmission line trunk line by a joint formed by at least one conductor, where the at least one conductor comprises one or more metals; and if the at least one other conductor comprises more than one metal, then at least the joint is covered with a layer of one metal having a thickness equal to or greater than a skin depth corresponding to a carrier frequency of signals, where the transmission line system is configured to propagate the signals.

Example 12 includes the transmission line system of Example 11, wherein if the at least one other conductor comprises at least one of more than the one metal, and adhesive, and the mechanical fastener, then at least the joint is covered with a layer of one type of metal having a thickness equal to or greater than a skin depth corresponding to a carrier frequency of signals, where the transmission lines are configured to propagate the signals.

Example 13 includes the transmission line system of any of Examples 11-12, wherein the at least one other conductor comprises only one metal that is silver.

Example 14 includes the transmission line system of any of Examples 11-13, wherein the one metal used to form the layer is silver.

Example 15 includes the transmission line system of any of Examples 11-14, wherein the transmission line trunk line is configured to be coupled to at least one antenna; and wherein each phasing line is configured to be coupled to a filter unit.

Example 16 includes the transmission line system of any of Examples 11-15, wherein the joint comprises of one of solder joint, braze joint, welded joint, an adhesive joint, and a mechanical fastener joint.

Example 17 includes the transmission line system of any of Examples 11-16, wherein the conductor of the phasing line and the conductor the transmission line trunk line are each center conductors of a coaxial transmission line.

Example 18 includes the transmission line system of Example 17, further comprising at least one conductive portion that forms an outer conductor of the coaxial transmission line.

Example 19 includes the transmission line system of Example 18, further comprising at least one solid insulator inserted between the at least one conductive portion and at least one of the conductors of each phasing line and the conductor of the trunk line transmission line.

Example 20 includes the transmission line system of any of Examples 18-19, further comprising at least one other conductive portion that is attached to the at least one conductive portion to form the outer conductor.

Example 21 includes a remote antenna unit, comprising: a first primary uplink signal path; a first primary downlink signal path; a Nth primary uplink signal path, where N is an integer greater or equal to two; a Nth primary downlink signal path; a first duplexer coupled to the first primary uplink signal path and the first primary downlink signal path; a Nth duplexer coupled to the Nth primary uplink signal path and the Nth primary downlink signal path; wherein the first duplexer and the Nth duplexer are configured to be coupled to a transmission line system; wherein the transmission line system comprises a transmission line trunk line connected to a first phasing line and an Nth phasing line; wherein a conductor of each phasing line is connected to a conductor of the transmission line trunk line by a joint formed by at least one conductor, where the at least one conductor comprises one or more metals; and if the at least one other conductor comprises more than one metal, then the method further comprises covering at least the joint with a layer of one metal having a thickness equal to or greater than a skin depth corresponding to a carrier frequency of signals, where the transmission line system is configured to propagate the signals; and wherein the transmission line system is configured to couple an antenna to the first duplexer and the Nth duplexer.

Example 22 includes the remote antenna unit of Example 21, wherein if the at least one other conductor comprises at least one of more than the one metal, and adhesive, and the mechanical fastener, then at least the joint is covered with a layer of one type of metal having a thickness equal to or greater than a skin depth corresponding to a carrier frequency of signals, where the transmission lines are configured to propagate the signals.

Example 23 includes the remote antenna unit of any of Examples 21-22, wherein the at least one other conductor comprises only one metal that is silver.

Example 24 includes the remote antenna unit of any of Examples 21-23, wherein the one metal used to form the layer is silver.

Example 25 includes the remote antenna unit of any of Examples 21-24, wherein the transmission line trunk line is configured to be coupled to the at least one antenna; and wherein each phasing line is configured to be coupled to a unique duplexer.

Example 26 includes the remote antenna unit of any of Examples 21-25, wherein the joint comprises of one of solder joint, braze joint, and welded joint.

Example 27 includes the remote antenna unit of any of Examples 21-26, wherein the conductor of the phasing line and the conductor the transmission line trunk line are each center conductors of a coaxial transmission line.

Example 28 includes the remote antenna unit of Example 27, further comprising at least one conductive portion that forms an outer conductor of the coaxial transmission line.

Example 29 includes the remote antenna unit of Example 28, further comprising a least one solid insulator inserted between the at least one conductive portion and at least one of the conductor of each phasing line and the conductor of the trunk line transmission line.

Example 30 includes the remote antenna unit of any of Examples 21-29, further comprising the transmission line system.

Example 31 includes the remote antenna unit of Example 30, further comprising the antenna.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. Therefore, it is manifestly intended that this invention be limited only by the claims and the equivalents thereof.

The invention claimed is:

1. A method for joining a first conductor of a first transmission line to a second conductor of a second transmission line, the method comprising:
attaching the first conductor to the second conductor with a joint formed by at least one other conductor, wherein the at least one other conductor comprises at least one of more than one metal, an adhesive, and a mechanical fastener; and
covering at least the joint with a layer of one type of metal having a thickness equal to or greater than a skin depth in the layer, wherein the skin depth is a function of (a) material characteristics of the layer and (b) a carrier frequency of a signal configured to propagate in the layer.

2. The method of claim 1, wherein the one type of metal is silver.

3. The method of claim 1, wherein attaching comprises at least one of soldering, brazing, and welding.

4. The method of claim 1, wherein covering comprises at least one of electro-plating and sputtering.

5. The method of claim 1, wherein the first conductor and the second conductor are each a center conductor of a coaxial transmission line.

6. The method of claim 5, further comprising, inserting the first conductor and the second conductor into at least one conductive portion that forms at least part of an outer conductor of the coaxial transmission line.

7. The method of claim 6, further comprising inserting at least one solid insulator between the at least one conductive portion and at least one of the first conductor and the second conductor.

8. The method of claim 7, attaching at least one other conductive portion to the at least one conductive portion to form the outer conductor.

9. A transmission line system, comprising:
a transmission line trunk line connected to at least one phasing line; and
wherein a conductor of each phasing line is connected to another conductor of the transmission line trunk line by a joint formed by at least one other conductor, wherein the at least one other conductor comprises at least one of more than one metal, an adhesive, and a mechanical fastener;
wherein at least the joint is covered with a layer of one type of metal having a thickness equal to or greater than a skin depth in the layer, wherein the skin depth is a function of (a) material characteristics of the layer and (b) a carrier frequency of a signal configured to propagate in the layer.

10. The transmission line system of claim 9, wherein the one type of metal is silver.

11. The transmission line system of claim 9, wherein the transmission line trunk line is configured to be coupled to at least one antenna;
wherein each phasing line is configured to be coupled to a filter unit.

12. The transmission line system of claim 9, wherein the joint comprises of one of a solder joint, a braze joint, a welded joint, an adhesive joint, and a mechanical fastener joint.

13. The transmission line system of claim 9, wherein the conductor of each phasing line and the conductor the transmission line trunk line are each center conductors of a coaxial transmission line.

14. The transmission line system of claim 13, further comprising at least one conductive portion that forms an outer conductor of the coaxial transmission line.

15. The transmission line system of claim 14, further comprising at least one solid insulator inserted between the at least one conductive portion and at least one of the conductor of each phasing line and the conductor of the transmission line trunk line.

16. The transmission line system of claim 14, further comprising at least one other conductive portion that is attached to the at least one conductive portion to form the outer conductor.

17. A remote antenna unit, comprising:
a first primary uplink signal path;
a first primary downlink signal path;
a Nth primary uplink signal path, where N is an integer greater or equal to two;
a Nth primary downlink signal path;
a first duplexer coupled to the first primary uplink signal path and the first primary downlink signal path;
a Nth duplexer coupled to the Nth primary uplink signal path and the Nth primary downlink signal path;
wherein the first duplexer and the Nth duplexer are configured to be coupled to a transmission line system; and
wherein the transmission line system comprises:
a transmission line trunk line connected to a first phasing line and an Nth phasing line;
wherein a conductor of each phasing line is connected to a conductor of the transmission line trunk line by a joint formed by at least one other conductor, wherein the at least one other conductor comprises at least one of more than one metal, an adhesive, and a mechanical fastener; and
wherein at least the joint is covered with a layer of one type of metal having a thickness equal to or greater than a skin depth in the layer, wherein the skin depth is a function of (a) material characteristics of the layer and (b) a carrier frequency of a signal configured to propagate in the layer;
wherein the transmission line system is configured to be coupled an antenna to the first duplexer and the Nth duplexer.

18. The remote antenna unit of claim 17, wherein the one type of metal is silver.

19. The remote antenna unit of claim 17, wherein the transmission line trunk line is configured to be coupled to the antenna;
wherein each phasing line is configured to be coupled to a unique duplexer.

20. The remote antenna unit of claim 17, wherein the joint comprises of one of solder joint, braze joint, and welded joint.

21. The remote antenna unit of claim 17, wherein the conductor of each phasing line and the conductor the transmission line trunk line are each center conductors of a coaxial transmission line.

22. The remote antenna unit of claim 21, further comprising at least one conductive portion that forms an outer conductor of the coaxial transmission line.

23. The remote antenna unit of claim 22, further comprising a least one solid insulator inserted between the at least one conductive portion and at least one of the conductor of each phasing line and the conductor of the transmission line trunk line.

24. The remote antenna unit of claim 17, further comprising the transmission line system.

25. The remote antenna unit of claim 24, further comprising the antenna.

* * * * *